United States Patent
Underwood, Jr. et al.

[11] Patent Number: 5,816,535
[45] Date of Patent: Oct. 6, 1998

[54] EMERGENCY CARGO EXTRACTION PARACHUTE JETTISON SYSTEM

[75] Inventors: Robert B. Underwood, Jr.; Anthony R. Walton, both of Ontario; Harold W. Fowler, Diamond Bar; Dwayne R. Wedlaw, Winnetka, all of Calif.

[73] Assignee: Lockheed Martin Corporation, Palmdale, Calif.

[21] Appl. No.: 631,193

[22] Filed: Apr. 10, 1996

[51] Int. Cl.$^6$ .............................. B64D 1/12; B64D 17/64
[52] U.S. Cl. .................................. 244/137.3; 244/151 B; 244/152
[58] Field of Search ................................ 244/137.3, 147, 244/149, 150, 151 B, 152

[56] References Cited

U.S. PATENT DOCUMENTS

| | | |
|---|---|---|
| 3,023,498 | 3/1962 | Temple et al. . |
| 3,257,089 | 6/1966 | Samms . |
| 3,425,739 | 2/1969 | Frost et al. ........................ 244/137.3 X |
| 3,670,999 | 6/1972 | Leger .................................... 244/137.3 |
| 3,801,051 | 4/1974 | Hosterman et al. . |
| 3,840,988 | 10/1974 | Hoffman . |
| 3,865,333 | 2/1975 | Fielding et al. ..................... 244/151 B |
| 5,284,310 | 2/1994 | Conway, Jr. . |

FOREIGN PATENT DOCUMENTS

2042435  9/1980  United Kingdom .

*Primary Examiner*—William Grant
*Attorney, Agent, or Firm*—Robert A. Schruhl

[57] ABSTRACT

The invention is a control system for the emergency jettison of a cargo container extraction parachute from a cargo container within an aircraft, the aircraft having a plurality of cargo containers onboard that are ejectable in sequence. In detail, the system includes a load transfer coupling coupled to each extraction parachute for releasing the extraction chute from the cargo container upon receipt of electrical power. A first circuit is coupled to the load transfer coupling, the first circuit for providing the electrical power to the load transfer coupling of the next ejectable cargo container upon receiving an actuation signal to release the extraction parachute. A second circuit is used to sense when each of the plurality of cargo containers has been ejected from the aircraft and to provide the cargo container ejection signal to the first circuit upon the cargo container being ejected from the aircraft. The actuation signal is provided to the first circuit if the ejection signal is not received within a specific time after initiation of the cargo ejection sequence. A third circuit is used to manually provide the actuation signal to the first circuit providing immediate jettison of the extraction parachute.

8 Claims, 8 Drawing Sheets

EMERGENCY CARGO EXTRACTION PARACHUTE JETTISON SYSTEM

BACKGROUND OF THE INVENTION

1. Field of the Invention

The invention relates to the field of airborne cargo jettison systems and, in particular, to an improved system to automatically release a deployed cargo extraction parachute should the cargo become jammed within the aircraft.

2. Description of Related Art

The typical aerial delivery system (ADS) using parachutes includes a drogue parachute, an extraction parachute, and a cargo recovery parachute with associated rigging lines. In operation, the drogue parachute is coupled to the extraction parachute. However, upon initial deployment behind the aircraft as the aircraft approaches the drop zone, it is restrained from extracting the extraction parachute by a towplate mounted in the cargo compartment floor. If the drogue parachute properly deploys, the operator in control of the ADS will release the attachment line so that the drogue parachute can deploy the extraction parachute. The extraction parachute extracts the cargo from the aircraft and the recovery parachute lowers it to the ground. An improperly deployed drogue parachute can cause the ADS to malfunction or cause difficulty. Typically, the towplate is designed to allow release of the drogue parachute if such conditions occur. Towplate functions are described in U.S. Pat. Nos. 3,801,051 "Tow Plate" to Hosterman, et al. and 3,257,089 "Emergency Release For Extraction Chute" by A. Samms or UK Patent Application 2,042,435 "Tow Plate" by J. W. Bolender, et al. At towplate release the cargo extraction parachute pulls the load from the aircraft. If this load becomes hung or stuck, it may result in loss of the aircraft for, in most instances, the aircraft is not capable of towing the extraction parachute when it is fully deployed outside of the aircraft. Thus such cargo jettison systems must also incorporate means to jettison a deployed extraction parachute in the case of a malfunction.

Procedures in general use today require having the loadmaster to secure the load and, thereafter, physically cut the extraction parachute attachment line to release it from the airplane. This procedure places the aircraft and crew at great risk. Therefore, emergency extraction parachute jettison capability is necessary. In order to eliminate the need for the loadmaster to physically cut the parachute line, automatic line severing devices have been incorporated into the aircraft. For example, U.S. Pat. No. 5,284,310 "Parachute Line Severing Apparatus" by R. E. Conway, Jr., discloses a device that includes a cutter assembly located on the wall of the cargo compartment. The cutter assembly includes a take up reel having a line that loops about the wall of the cargo compartment and, thus, around the extraction parachute line. Should a malfunction of the extraction parachute occur or the cargo becomes jammed inside the aircraft, the loadmaster can actuate the device which will retract the line so that it pulls the extraction parachute line into cutters mounted in the cutter assembly severing the extraction line. While a better approach than manually cutting the line, it has several short comings. One is the fact that the line used to draw the attachment line into the cutter assembly must be strung around the cargo compartment; thus it could easily become snagged, preventing proper actuation. Secondly, it takes a finite amount of time to "pull" the extraction line into the cutters. Finally, it is not fully automatic.

Of course, explosively actuated cutters can be substituted, for example the cutters disclosed in U.S. Pat. Nos. 3,840,988 "Suspension Strap Cutting Apparatus" by N. H. Hoffman, et al. and 3,023,498 "Parachute Harness Strap Cutter" by R. Temple, et al. Here again, there is no automatic release feature.

Thus it is a primary object of the subject invention to provide a system to release a cargo extraction parachute should the cargo attached thereto become jammed within the cargo compartment.

It is another primary object of the subject invention to provide a system that automatically will release a cargo extraction parachute should the cargo attached thereto become jammed within the cargo compartment.

It is a further object of the subject invention to provide a system that automatically will release a cargo extraction parachute should the cargo attached thereto become jammed within the cargo compartment and also provides manual override by the loadmaster.

It is a still further object of the subject invention to provide a system that will automatically release a cargo extraction parachute should the cargo attached thereto become jammed within the cargo compartment and where the timing between the sensing of the jammed cargo and the release can be adjusted.

SUMMARY OF THE INVENTION

In a typical ejection sequence for jettisoning a plurality of cargo containers from an aircraft, a drogue parachute is first deployed. If deployment occurs, the drogue parachute thereafter is used to "pull out" the first extraction parachute. Thereafter, the extraction parachute is separated from the cargo container and the recovery parachute lowers the container safely to the ground. Because the drag produced by the extraction parachute is so great, if the cargo container becomes jammed, means must be provided to jettison the deployed extraction parachute, lest the aircraft be lost. The subject system is used to release the extraction parachute under these conditions.

Thus, in general terms, the invention is a control system for the emergency jettison of a cargo container extraction parachute from a cargo container positioned within an aircraft, the aircraft having a plurality of cargo containers onboard that are ejectable in sequence. The system includes a load transfer coupling connected to the attachment line of each extraction parachute for releasing the extraction parachute from the cargo container upon receipt of electrical power. In more detail, the load transfer coupling includes a bracket having first and second attachment fittings mounted thereon for connecting the attachment lines of the recovery parachute and the extraction parachute, respectively, thereto. Preferably, the attachment fitting is a pin and the attachment line includes a looped end wrapped there around. An electrically initiated explosively actuated line cutter is mounted on the bracket for severing the looped end of the extraction parachute attachment line from the coupling upon receipt of electrical power. A clamp is used to releasably connect the coupling to the cargo container A first circuit, preferably including a programmable microprocessor, receives actuation signals to release the extraction parachute and is adapted, upon receipt of an actuation signal, to activate a relay that connects electrical power to the electrically initiated explosively actuated line cutter. However, upon receiving the actuation signal, the microprocessor limits the application of the electrical power to only the load transfer coupling connected to the next ejectable cargo container. Furthermore, the microprocessor incorporates a timing circuit such that, if an ejection signal, indicating that the next ejectable cargo container has been ejected is not received within a specific time after initiation of the cargo jettison sequence, the first circuit initiates jettison of the extraction parachute. If the ejection signal is received within the specified time, the microprocessor resets, and it is again ready to initiate jettison of the extraction parachute of the next cargo container in line.

A second circuit is used to sense when each of the plurality of cargo containers has been ejected from the aircraft and to provide the cargo container ejection signal to the microprocessor upon the container being ejected from the aircraft. The second circuit preferably includes a flexible electrical line assembly coupling the mircroprocessor to the line cutter. An electrical connector is mounted in the line assembly having first and second halves in detachable engagement, such that when the cargo container next in line for jettisoning is, in fact, jettisoned, the connector halves detach from each other. An electrical circuit extending from the microprocessor extends through the joined first and second halves of the connector, such that when the connector halves separate, the electrical circuit is broken. A third circuit is provided that includes a switch to manually provide an actuation signal to the mircroprocessor that causes immediate actuation of the solid state switches (or relays) to release the extraction parachute.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
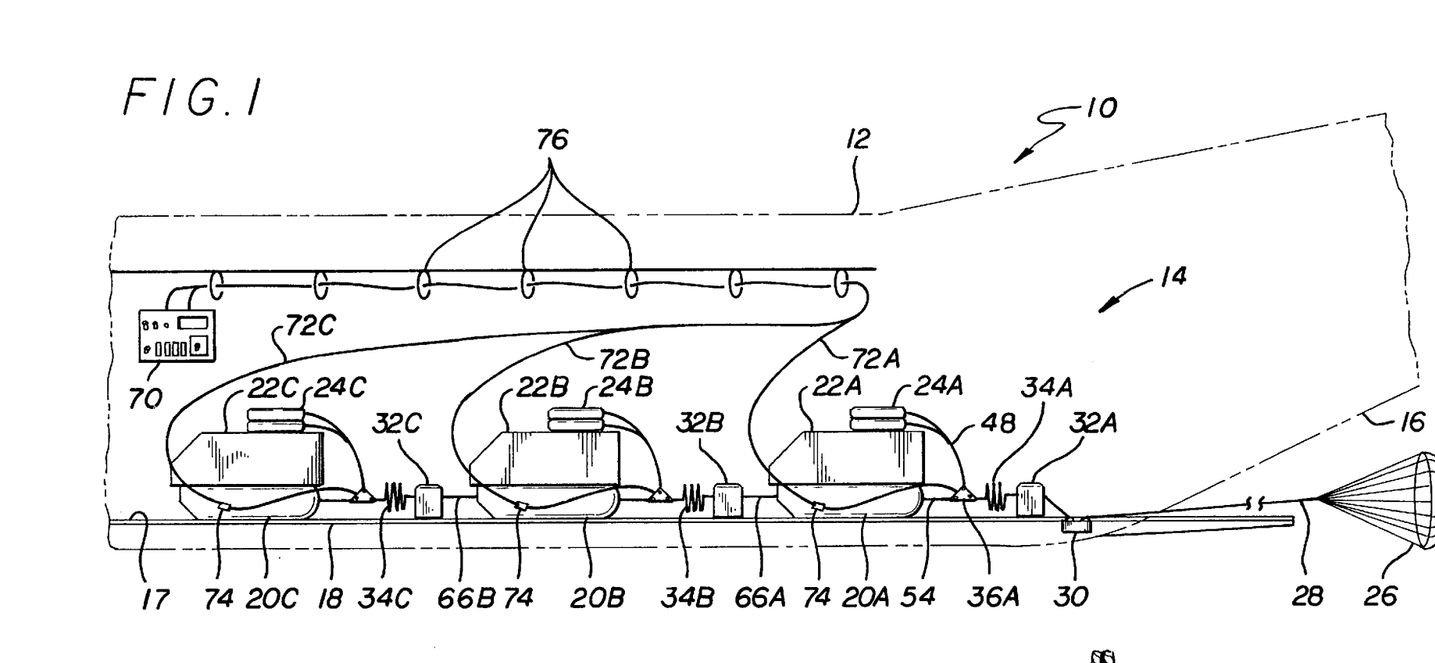
FIG. 1 is a semi-schematic representation of the cargo compartment of an aircraft adapted to air drop cargo out the aft end such as a Lockheed Martin Corporation C-130 Hercules aircraft.

Illustrated in FIG. 1 is a side view of the aft end of a cargo compartment of an aircraft in a semi-schematic form, generally indicated by numeral 10. Referring to FIG. 1, the aircraft 10, includes a fuselage 12 having a cargo compartment 14 and an open aft cargo door 16. The floor 17 of the cargo compartment 14 includes rails 18 upon which are mounted cargo pallets 20A, B, and C containing a plurality of cargo containers 22A, B and C. Each cargo container 22A–C includes a recovery parachute assembly 24A, 24B, and 24C, respectively, attached thereto that is opened after the individual cargo container has been ejected from the aircraft providing a safe descent to the ground.

The typical parachute delivery system includes a drogue parachute 26 shown deployed behind the aircraft 10 by an attachment line 28 restrained by a towplate 30. In operation, the drogue parachute 26 is deployed by the pilot or co-pilot around 20 to 40 seconds before reaching the drop zone. This insures that the drogue parachute 26 will be completely expanded prior to cargo jettison. If the drogue parachute 26 properly deploys, the pilot or co-pilot "gives" the green light signal as the aircraft 10 enters the drop zone.

The line 28, although restrained by the towplate 26, is connected to an extraction parachute 32A. The parachute 32A also includes an attachment line 34A that is releasably connected to an extraction force transfer coupling 36A. The lengths of the lines 66A and 66B must increase in length, depending upon their travel distance from the aft cargo door 16 so that the extraction parachute will not be opened until it has left the aircraft. Still referring to FIG. 1 and, additionally, to FIGS. 2 and 3, the coupling 36A includes two triangular shaped plates 37A and 37B in a spaced relationship held together by pins 38, 40 and 42. The end of the attachment line 34A is in the form of a loop 44 that is wrapped about pin 38. An attachment line 48 is connected by a looped end 50 to pin 40 and at its opposite end 52 to the recovery parachute assembly 24A. An attachment line 54 is coupled by one end to the pin 42 by means of a releasable clamp 56, while its opposite end is connected to the cargo pallet 20A. A lever 58 mounted on the pallet 20A is connected by a flexible shaft 60 to the clamp 56. The lever 58 is spring biased to a downward direction by a spring (not shown), but is held in a horizontal position by the floor 17. The clamp 56 is mechanically actuated to the open position releasing the pin 42 when the lever 58 moves downward. As will be subsequently discussed, this occurs when cargo pallet leaves the aircraft and the coupling 36 is disconnected from the pallet.

Figure 2:
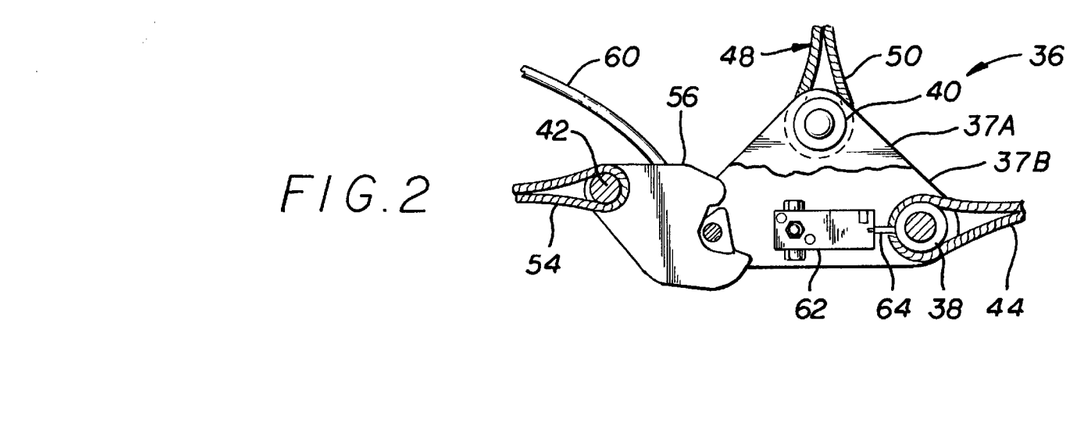
FIG. 2 is an enlarged partial cross-sectional view of the extraction force transfer coupling.
Figures 3, 5:
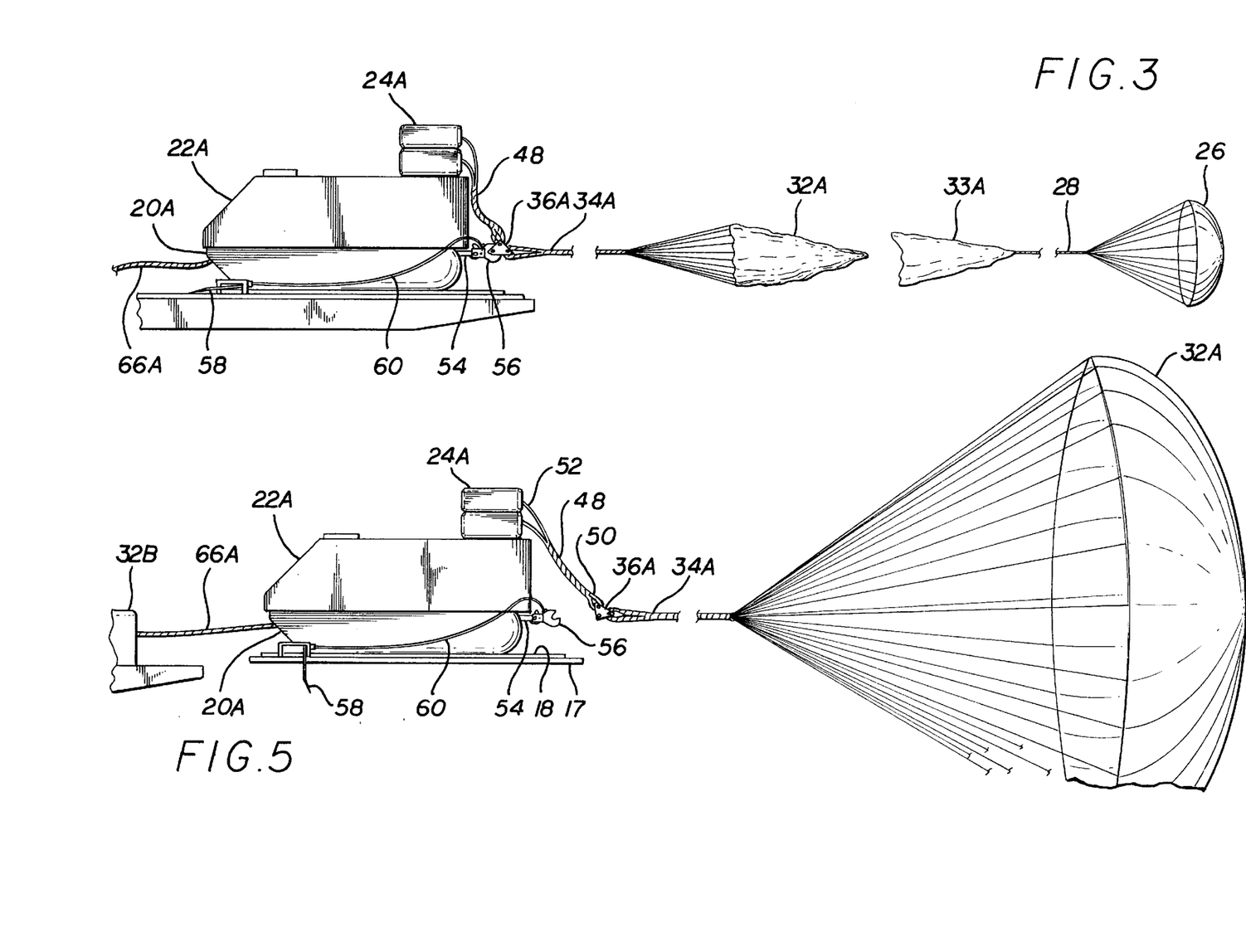
FIG. 3 is an enlarged view of a portion of FIG. 1 illustrating a single cargo pallet mounted in the cargo compartment.
FIG. 5 is an enlarged view of a cargo pallet and cargo container just at the mount of jettison from the aircraft.

An electrically initiated explosively actuated line cutter 62 is mounted on the coupling 36A positioned such that, when actuated, its cutter 64 severs the looped end 44 of the attachment line 28 freeing the extraction parachute 32A. The other cargo containers 22B and 22C are similarly rigged, except the pins 38 of the couplings 36B and 36C are attached by looped end lines 66A and 66B to the next in line pallets 20B and 20C, respectively, instead of the drogue parachute 26.

Figure 4:
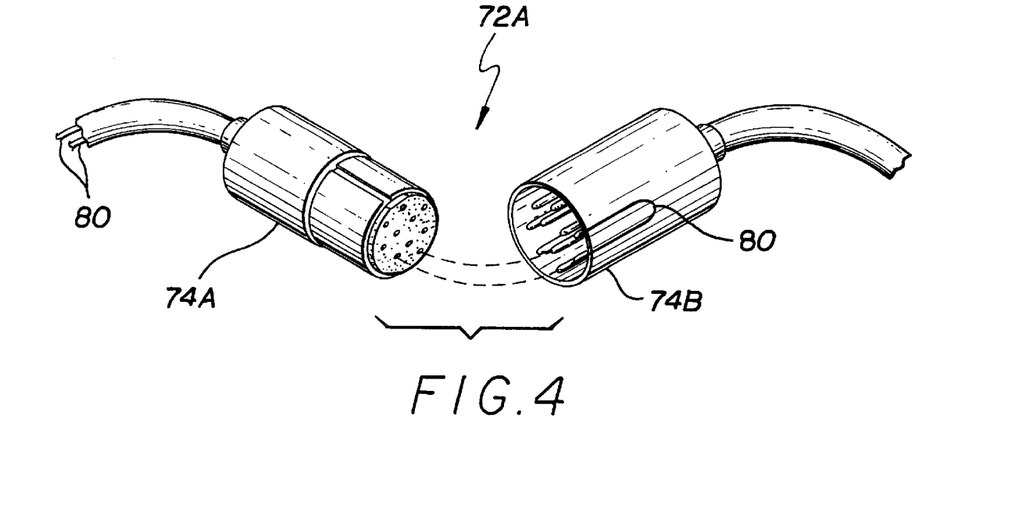
FIG. 4 is a partial enlarged view of an electrical line assembly, particularly illustrating a connector positioned in the line.

A control box 70 is mounted in the cargo compartment that is accessible by the loadmaster and is connected to each of the couplings 36A–C by means of electrical line assemblies 72A, B and C. Each of the line assemblies 72A–C include connector assemblies 74 having connector halves 74A and 74B that can be pulled apart by sufficient tension force on the line. Each line assembly 72A–C is supported by overhead supports 76 and have increasing lengths such that disconnection of the connector halves 74A and 74B, as will be subsequently discussed, will only occur upon jettison of the cargo pallet and cargo container. These line assemblies 72A–C are used to provide electrical power to the line cutters 62 of the couplings 36A–C. Referring to FIG. 4, the line assemblies 72A–C include a continuity circuit 80 extending from the control panel 70 through the connector halves 74A and 74B and back to the control box 70. Thus upon disconnection of the connector halves 74A and 74B, the circuit 80 is broken. As will be subsequently discussed, this circuit 80 is used to indicate if, and when, a cargo pallet and cargo container has been successfully ejected from the aircraft.

Referring to FIGS. 1–5, ideally, when the green light is given and the towplate 30 releases the line 28, the drogue parachute 26 pulls the extraction parachute 34A out of the aircraft. Being attached to only the extraction parachute cover 33A, it pulls it off the actual parachute allowing it to open. The extraction parachute 32A, once opened, pulls the next-in-line cargo pallet 20A and cargo container 22A out of the aircraft. Once the pallet 20A has exited the aircraft, the lever 58 is automatically allowed to rotate downward and the clamp 56 is opened releasing the coupling 36A from the cargo pallet 20A. This will cause the extraction parachute 32A to apply a drag force to the recovery parachute 24A pulling its cover (not shown) off and allowing it to open. As the cargo pallet 20A and cargo container 22A are deployed, the next extraction parachute 32B is pulled out of the aircraft. Here again its cover will be removed allowing it to fully inflate and the sequence repeats itself until the last extraction parachute 32C pulls the cargo pallet 20C and cargo container 22C has been deployed from the aircraft. However, what if one of the cargo pallets gets jammed after its extraction parachute has opened? Extraction parachutes are quite large and can produce so much drag that the aircraft may not be able to remain airborne.

Figure 6:
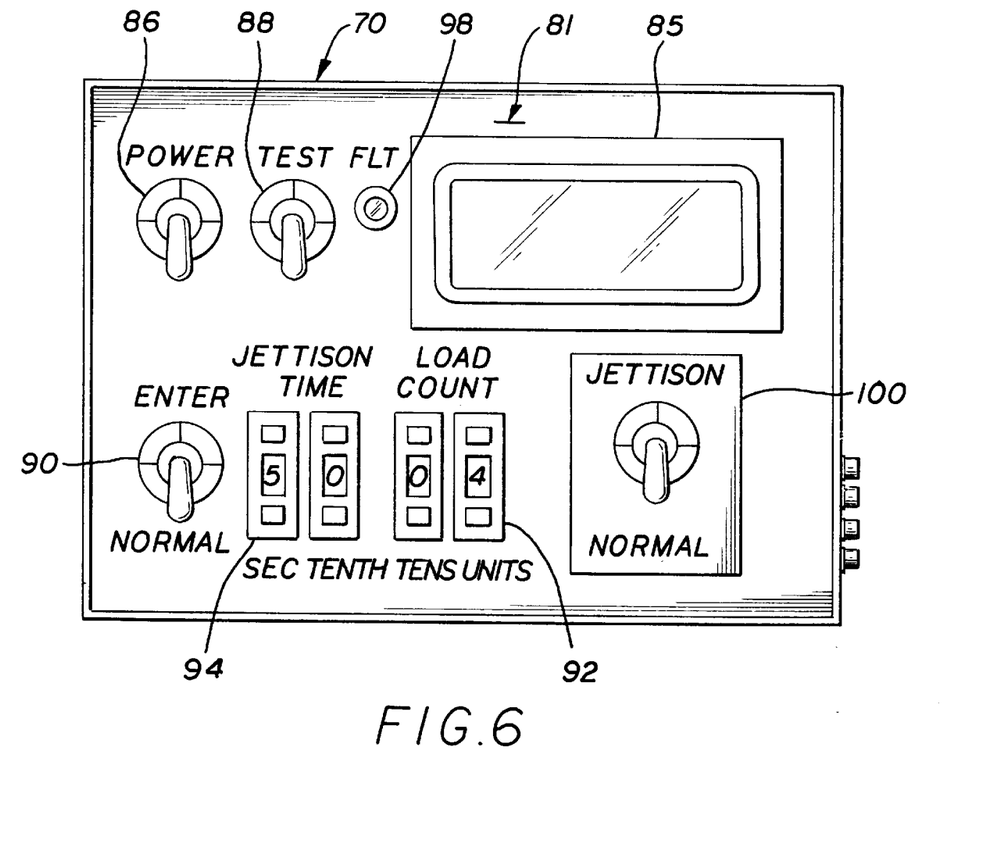
FIG. 6 is a view of the control box front panel used in the emergency cargo extraction parachute jettison system.
Figure 7:
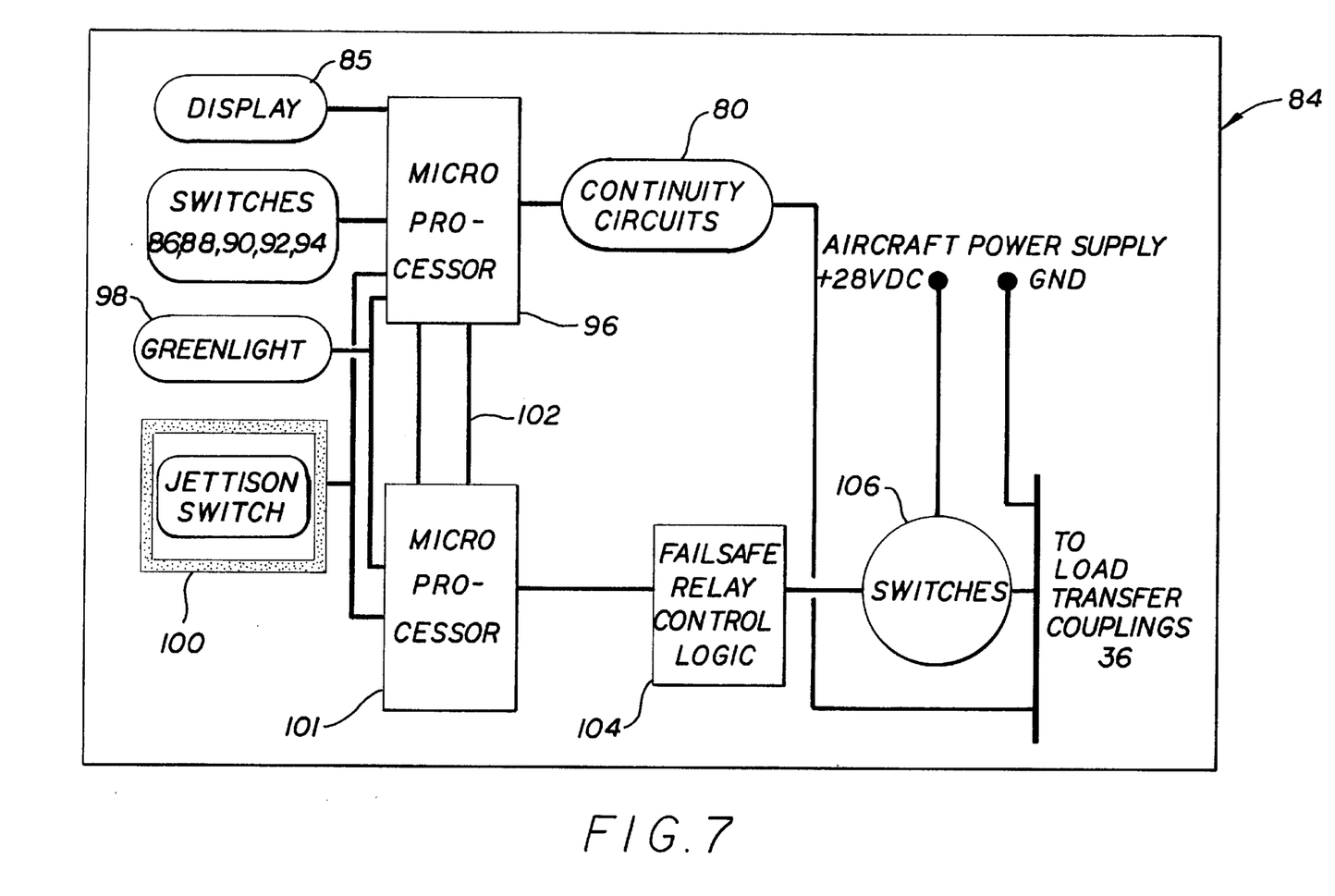
FIG. 7 is a block diagram of the control circuit for the control box.

Referring to FIG. 6, which is a view of the front of panel 81 of the control box 70, and FIG. 7 which is a block diagram of the emergency jettison control system contained inside, generally indicated by numeral 84. The system 84 includes status display window 85, a power switch 86, test switch 88, data enter switch 90, cargo container number thumb wheel switch 92, and jettison time thumb wheel switch 94 which are all coupled to a main mircoprocessor 96. A green light indicator input line 97 having a lamp 98 therein and a manual jettison switch 100 are coupled to both the microprocessor 96 and a backup microprocessor 101. The microprossesors 96 and 101 are connected by inter process communication links 102 such that each one can perform the functions independently should one fail. The microprocessor 101 is connected to a fail-safe relay control logic circuit 104, which in turn is coupled to switches 106. The switches 106 (preferably solid state switches), when actuated, couple electrical power to the line cutters 62 via line assemblies 72A–C. The continuity circuit 84 within the line assemblies 72A–C is connected to the microprocessor 86.

Jettison procedures are the sequence of events (programs) that lead to the selection of the proper jettison algorithm when the extraction parachute jettison is necessary. The real-time jettison procedures take into account several factors including, system configuration, setup, device checkout, and switch inputs. This information allows the system to select the appropriate algorithm when a parachute jettison is required. These procedures include the manual jettison procedure (MJP), and the Automatic Backup Jettison Procedure (AJP). These operational procedures allow the system to respond to an emergency jettison request by automatic backup jettison command or manual jettison command.

Figure 8:
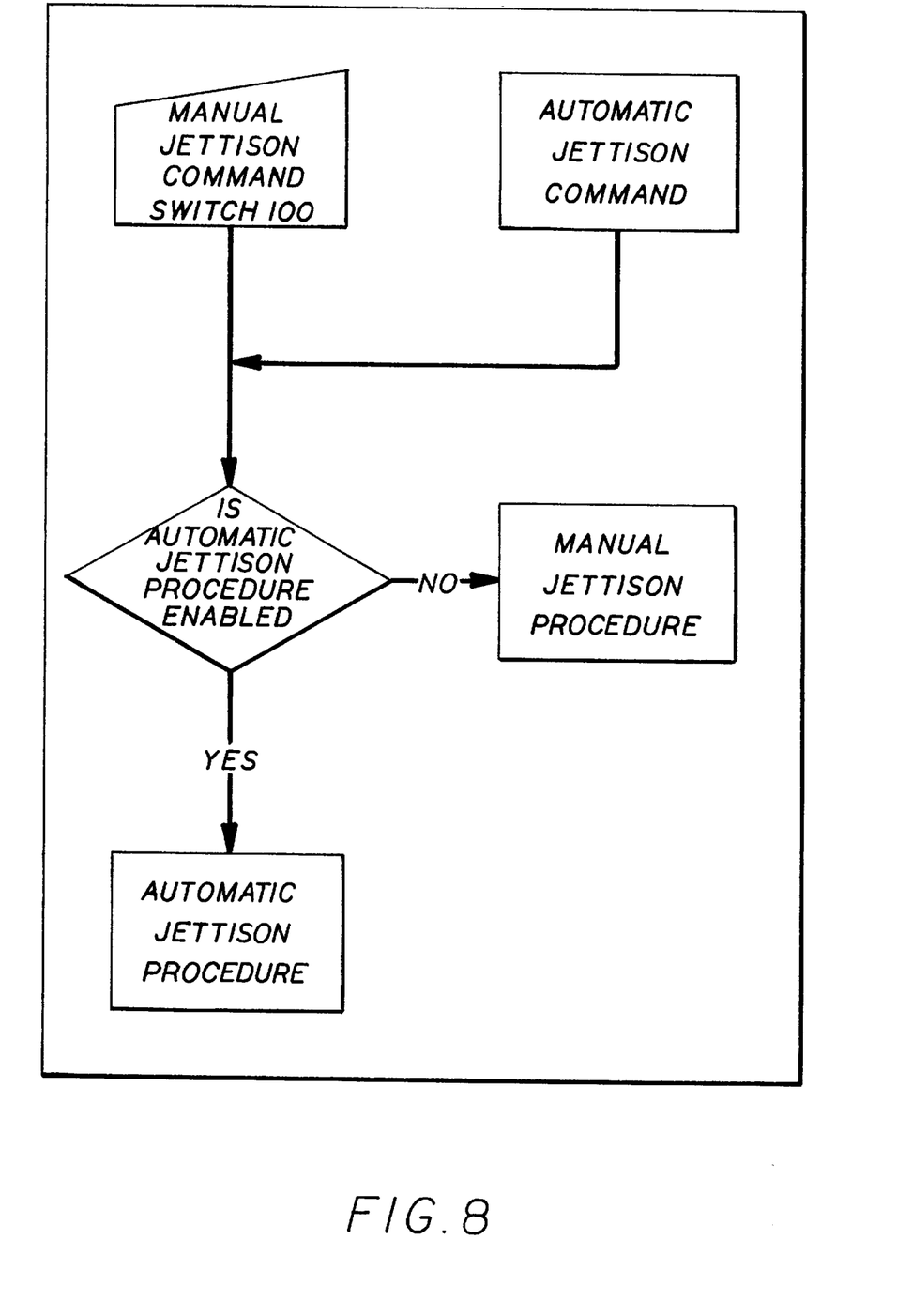
FIG. 8 is a flow chart for a computer program used in the cargo extraction parachute system for providing manual jettison of the extraction parachute should automatic jettison become unavailable.

In the event of cargo pallet 20A–C jettison malfunction, two jettison modes are available: the load master can initiate manual jettison by activating switch 100, or if after a preset time, the system 84 will automatically initiate extraction parachute jettison. The system 84 also computes which procedure is to be used. The Automatic Jettison Procedure/ Manual Jettison Procedure (AJP/MJP) selection algorithm must determine in real-time which procedure is to be used. Basically, if all qualifying conditions have not been met, the MJP is selected. This guarantees a jettison capability when the manual jettison switch 100 is activated. A flow chart for a computer program to accomplish this function is illustrated in FIG. 8.

Figure 9:
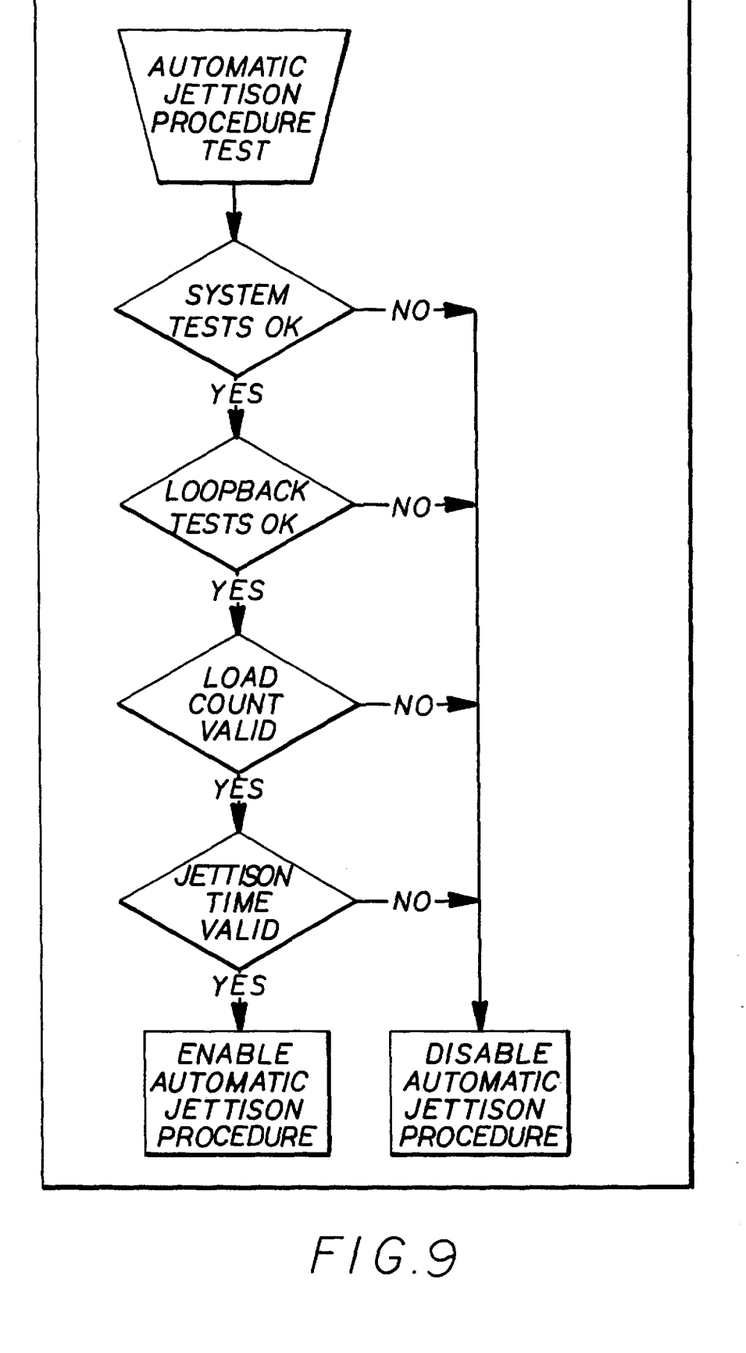
FIG. 9 is a flow chart of a computer program used for determining if the automatic jettison procedure is functioning.

Use of the AJP is determined by several factors as illustrated in FIG. 9 which is a block diagram of the AJP automatic jettison enable/disable computer program. The AJP is used to intelligently release the extraction parachute of the next load to leave the aircraft. If this determination cannot be made, or if the loadmaster has disabled the AJP from the control panel, the AJP will be disabled. Factors that determine the enabling of the automatic backup jettison procedure include system tests such as self tests, loopback tests, that are executed to validate unit integrity and proper operation must pass. This includes self-test, loopback, continuity circuit 80, fail-safe, power supply, and switch position tests. In addition, it checks to determine if the number of cargo containers jettison times (time when jettison of the extraction parachute will be automatically accomplished unless the cargo container has been ejected).

Figure 10:
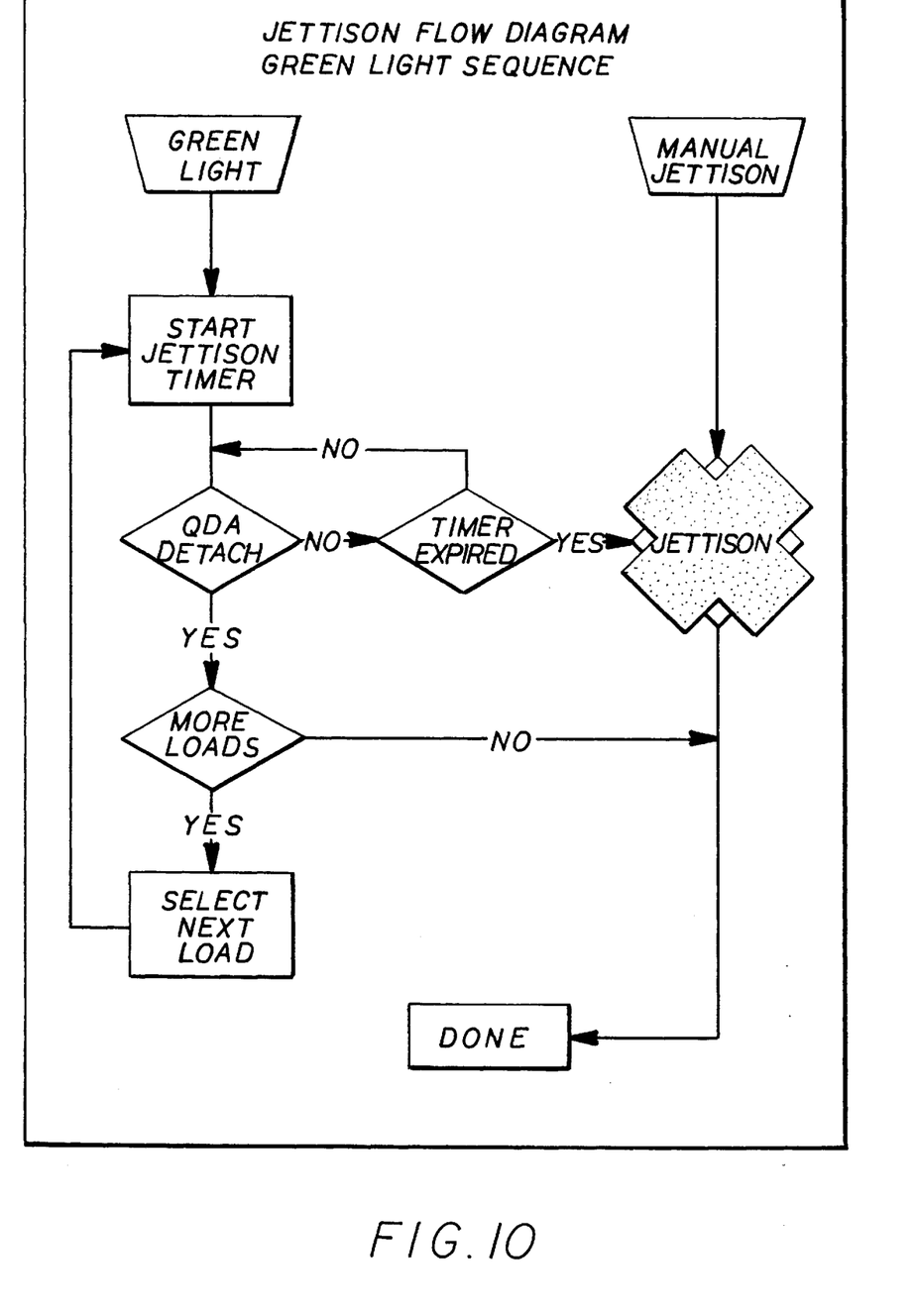
FIG. 10 is a flow chart of a computer program used for automatic jettison of the extraction parachute upon initiation of the cargo jettison sequence.
Figure 11:
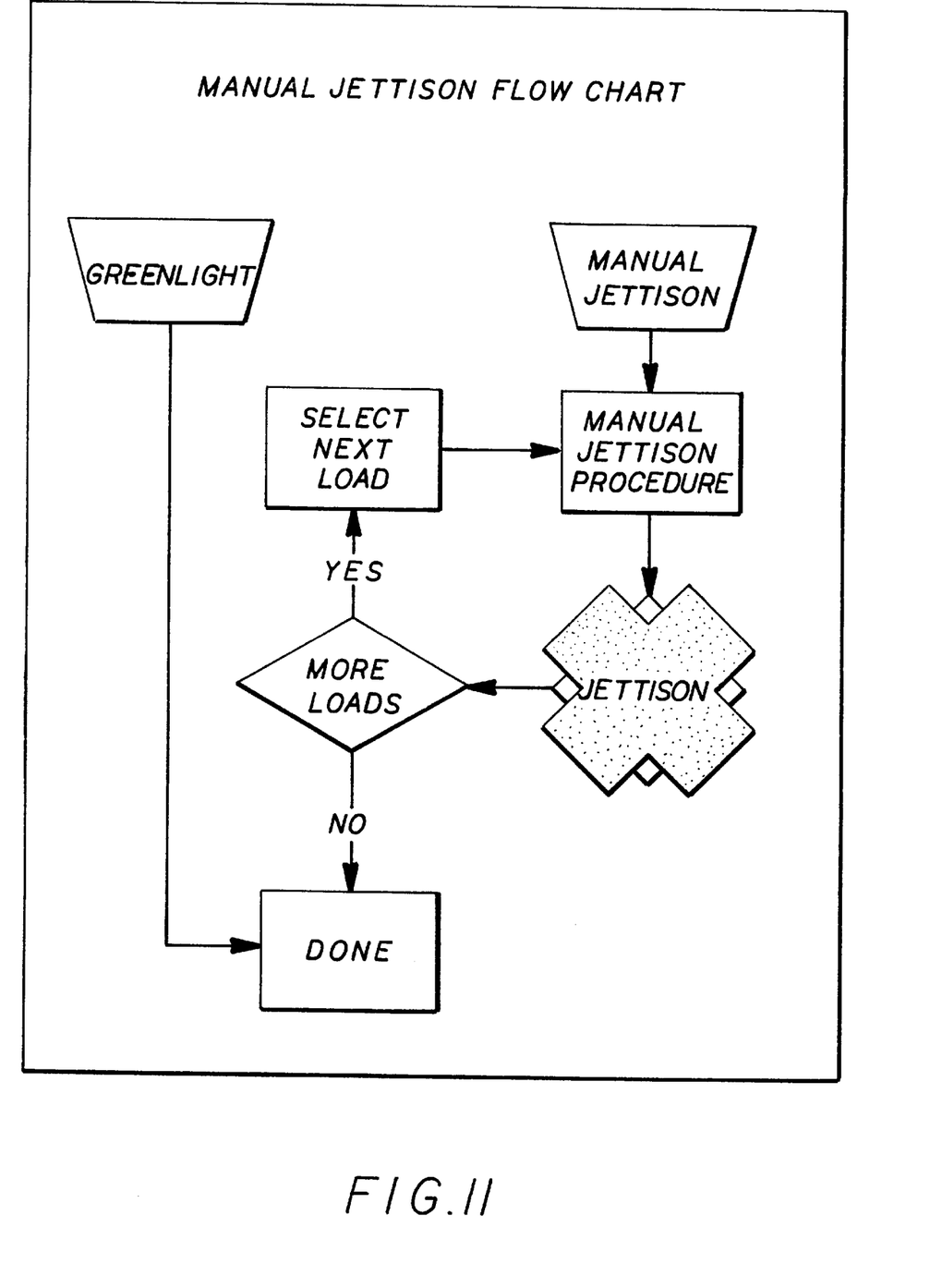
FIG. 11 is a flow chart of a computer program used for manual jettison of the extraction parachute upon initiation of the cargo jettison sequence.

Presented in FIG. 10 is a flow chart for a computer program used to automatically jettison an extraction parachute after actuation of the green light (towplate release) by the pilot or copilot, while illustrated in FIG. 11 is a flow chart of a computer program for providing manual jettison of the extraction parachute. These flow charts provide all the information necessary to write the actual computer programs necessary to operate the control circuit 80 (microprocessors).

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The Invention has applicability to the aircraft industry.

We claim:

1. A control system for the emergency jettison of a cargo container extraction parachute from a cargo container within an aircraft, the aircraft having a plurality of cargo containers on board that are ejectable in sequence, each cargo container having a respective extraction parachute, the system comprising:

first means coupled to each extraction parachute for releasing the extraction parachute from the respective cargo container upon receipt of electrical power;

second means coupled to said first means, said second means comprising a first circuit, said circuit providing the electrical power to said first means for releasing the extraction parachute from the next in line sequentially cargo container upon receipt of an actuation signal;

third means to sense when each of the plurality of cargo containers has been ejected from the aircraft and to provide a cargo container ejection signal to said first circuit upon the next in line sequentially cargo container being ejected from the aircraft;

said actuation signal being provided to said second means if said ejection signal is not received within a specific time after initiation of the ejection of said next in line sequentially cargo container; and fourth means to manually provide the actuation signal to said second means.

2. The control system as set forth in claim 1 wherein said second means further comprises:

a switch coupled to a source of electrical power and adapted to apply the electrical power to said first means upon receipt of said actuation signal;

a programmable microprocessor, said mircroprocessor adapted to provide said actuation signal;

means to enter the number of cargo containers into said microprocessor; and means to enter the specific time into said mircroprocessor.

3. The control system as set forth in claim 2 wherein each extraction parachute includes a cargo container attachment line and each of said cargo containers includes a respective recovery parachute assembly coupled thereto having an attachment line, and said first means comprises:

a load transfer coupling comprising:
a bracket;
first and second attachment fittings mounted on said bracket for connecting the attachment lines of said recovery parachute and said extraction parachute, respectively, to said coupling and
means to sever the extraction parachute attachment line from said coupling upon receipt of the electrical power; and
means to releasably connect said coupling to said cargo container.

4. The system as set forth in claim 3 wherein said fourth means comprises a switch coupled to said mircroprocessor for providing the actuation signal thereto.

5. The system as set forth in claim 4 wherein said switch is connected to said means to sever the extraction parachute attachment line from said coupling upon receipt of the electrical power by a flexible electrical line assembly.

6. The system as set forth in claim 5 wherein said means to sever the extraction parachute attachment line from said coupling upon receipt of the electrical power includes an electrically initiated explosively actuated line cutter.

7. The system as set forth in claim 6 wherein each of said attachment lines of said extraction parachutes includes a looped end, said system further comprising:

said load transfer coupling includes a pin for receiving the looped end of the attachment line of said extraction parachute; and said electrically initiated explosively actuated line cutter is mounted on said coupling such that when actuated, the cutter thereof severs the looped end.

8. The system as set forth in claim 7 wherein said third means comprises an electrical connector mounted in said flexible electrical line assembly, said connector having first and second halves in detachable engagement such that when said next in line sequentially cargo container is ejected, said connector halves detach from each other;

an electrical circuit extending from said microprocessor and extending through said engaged first and second halves of said connector, such that when said connector halves detach, said electrical circuit is broken; and said microprocessor being adapted to sense the breaking of said electrical circuit.

* * * * *